JOHN M. BENNETT.
Improvement in Insect Destroyers.
No. 121,272. Patented Nov. 28, 1871.
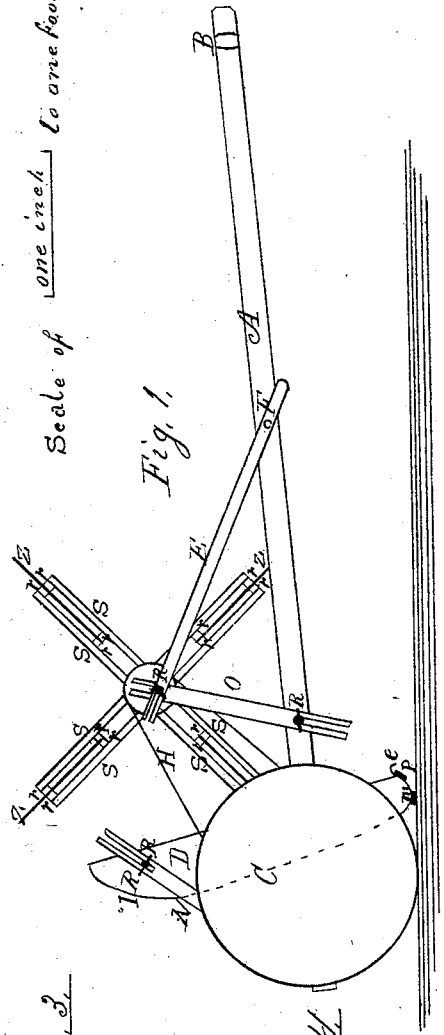
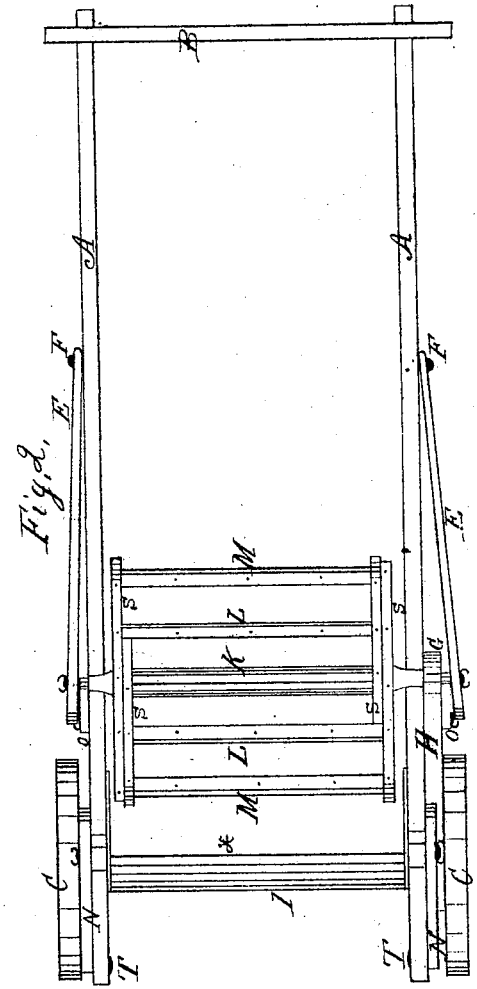
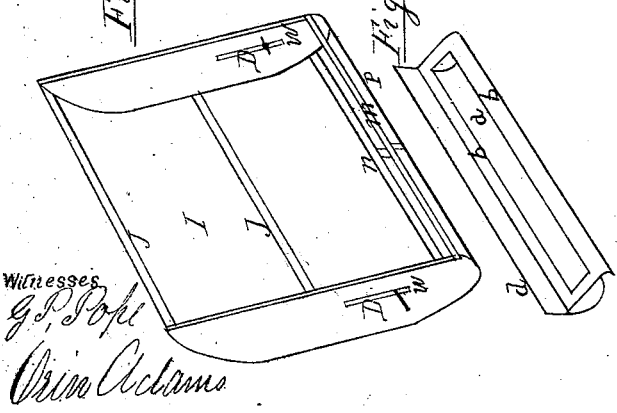

UNITED STATES PATENT OFFICE.

JOHN M. BENNETT, OF JAYNESVILLE, IOWA.

IMPROVEMENT IN INSECT-DESTROYERS.

Specification forming part of Letters Patent No. 121,272, dated November 28, 1871.

*To all whom it may concern:*

Be it known that I, JOHN M. BENNETT, of Jaynesville, in the county of Bremer and State of Iowa, have invented an Improvement in Machines for Catching Potato Bugs, of which the following is a specification:

The object of the present invention is to provide convenient means for catching bugs which infest potato-vines; and its nature consists in placing and arranging behind the beaters a catcher, by which, when the bugs are driven from the vines, they are caught and deposited in a receptacle below, said catcher being combined with the other parts of the device, as hereinafter fully shown and described.

In the drawing, Figure 1 is a longitudinal elevation of my machine; Fig. 2, a plan or top view of the same. Fig. 3 shows the catcher removed from the machine; Fig. 4, the trough removed from the catcher; Fig. 5, a section of the catcher and trough.

A B represent draw-bars, which are mounted on wheels C by means of any ordinary axle-tree, $x$, and which support the mechanism as follows: S S, &c., represent a beater, consisting of four or any other number of double-arms fastened to a shaft K, and of double cross-bars $r\ r\ r\ r$, &c., fastened in between the arms for the convenience of securing the brushes Z to the beater, rivets or screws being put through the cross-bars to clamp the brushes firmly in place. The brushes are made of broom-corn, splints of wood, or other similar material, which is both light and flexible. The shaft K of the beater has its journal-support in standards O on each side of the frame, said standards being slotted out at the lower ends as shown at Fig. 1, so that the beater may be raised or lowered, as any particular case may require, to bring the brushes Z against the vines whether they be high or low. The shaft is also supported by braces E fastened to the draw-bars A, and slotted out at their opposite ends so that the beater may be adjusted to or from the catcher D I. Set-screws R R, &c., being put through the slots of the brace E and standard O, hold them in fixed position when once adjusted. What I term a catcher is placed in front of the axle-tree, and it is held in position by inclined-braces N, whose upper ends are slotted so as to allow the catcher to be raised or lowered to suit the height of the vines, and held at its lower end by means of set-screws put through the slots $w$ in D D and into the draw-bars A, as shown more clearly in Fig. 3. This catcher consists of end pieces D covered on the back by canvas or fabric I, the latter being supported by ribs J J. The lower ends of the ends D have slats $n\ m\ p$ fastened to them for the purpose of carrying a trough, $d\ b\ a$, in which the bugs fall when beaten off from the vines, the parts $b$ projecting over the trough $a$ (proper) so as to prevent the bugs from crawling out. The trough is removable in order that the bugs may be readily disposed of when a sufficient quantity has been caught. The shaft K of the beater is provided with a pulley, so that a band, H, running from a drive-wheel on the axle-tree will communicate motion to the beater. The operation is very simple, requiring only that the beater be adjusted by means of the set-screws R, and the catcher D I adjusted by its respective set-screws; then the wheels C are made to move forward between the rows. This movement will cause the beater to strike the vines and drive the bugs into the trough, from which they can be removed.

In the foregoing I have described a complete machine, but disclaim the beaters, as similar devices have been used before.

What I claim, and desire to secure by Letters Patent, is—

The catcher D I combined with the trough $b\ d\ a$ and beater S S, when said parts are combined and arranged as and for the purpose set forth.

JOHN M. BENNETT.

Witnesses:
SAMUEL G. RIDER,
WM. H. RICH.

(63)